United States Patent
Yi

(10) Patent No.: US 8,218,410 B2
(45) Date of Patent: Jul. 10, 2012

(54) METHOD FOR MANAGING DEFECT OF OPTICAL DISC

(75) Inventor: Changsic Yi, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 2 days.

(21) Appl. No.: 12/986,715

(22) Filed: Jan. 7, 2011

(65) Prior Publication Data
US 2011/0170383 A1  Jul. 14, 2011

(30) Foreign Application Priority Data
Jan. 11, 2010 (KR) .................. 10-2010-0002154

(51) Int. Cl.
*G11B 7/00* (2006.01)
(52) U.S. Cl. .................. 369/53.1; 369/53.15
(58) Field of Classification Search .......... 369/53.1, 369/53.12, 53.15, 53.17, 53.31, 53.35, 53.42
See application file for complete search history.

(56) References Cited

U.S. PATENT DOCUMENTS
6,188,655 B1 *  2/2001  Yoshida et al. ............ 369/47.17
* cited by examiner

*Primary Examiner* — Nabil Hindi
(74) *Attorney, Agent, or Firm* — Birch, Stewart, Kolasch & Birch, LLP

(57) ABSTRACT

Disclosed is a method for managing a defect of an optical disc. In the method, when a host requests data of an optical disc inserted into an optical disc drive (ODD) included in a device to be integrated with a solid state drive (SSD), an address of the requested data is compared with contents contained in defect management information managed within the SSD, and the requested data is read from the optical disc or from the defect management information according to a result of the comparing. The defect management information may include optical disc identification information, address information, defect type information and data of a corresponding address. When the optical disc is inserted into the ODD, defect management information regarding the optical disc may be generated and stored in the SSD. Accordingly, Read Delay or Read Fail, resulting from a defect of the optical disc, can be obviated.

14 Claims, 5 Drawing Sheets

FIG. 6

| DMT | | | |
|---|---|---|---|
| Disc Info.1 | LBA 1 | Read Delay | Data |
| | LBA 2 | Read Delay | Data |
| | LBA 3 | Read Delay | Data |
| | LBA 4 | Read Fail | Data |
| | ⋮ | ⋮ | ⋮ |
| Disc Info.2 | LBA 1 | Read Delay | Data |
| | LBA 2 | Read Fail | Data |
| | LBA 3 | Read Fail | Data |
| | LBA 4 | Read Delay | Data |
| | ⋮ | ⋮ | ⋮ |
| Disc Info.3 | LBA 1 | Read Fail | Data |
| | LBA 2 | Read Delay | Data |

METHOD FOR MANAGING DEFECT OF OPTICAL DISC

This application claims the benefit of priority of Korean Patent Application No. 10-2010-0002154 filed on Jan. 11, 2010, which is incorporated by reference in their entirety herein.

BACKGROUND

1. Field

This document relates to a method for managing a defect of an optical disc in a device in which an Optical Disc Drive (ODD) and a Solid State Drive (SSD) are integrated.

2. Related Art

A variety of types of optical disc drives (ODD) have been in widespread use to record or reproduce data on an optical disc such as a compact disc (CD), a digital versatile disc (DVD), a blu-ray disc (BD).

As shown in FIG. 1, an optical disc drive is configured to include an optical pick-up 11, a data recorder/player driving a spindle motor, a sled motor and the optical pick-up 11 and processing a servo signal and recorded/reproduced data, an interface 16 connected to a host, a memory 17, and a controller 18 controlling the recording/reproducing unit. Here, the data recorder/player may be configured to include an LD driving unit 12, a radio frequency (RF) unit 13, a digital signal processor (DSP) 14, a servo/driving unit 15 and the like, and the LD driving unit 12 may be included in the optical pick-up 11.

The controller 18 controls the servo/driving unit 15 such that the spindle motor and the sled motor are rotated to rotate an optical disc at a predetermined speed while moving the optical pick-up into the inner circumferential region of the optical disc. Furthermore, the controller 18 controls the data recorder/player so as to carry out data recording/reproducing operations for recording or reproducing data on the optical disc.

Meanwhile, a Solid State Drive (SSD), a device that stores information by using a semiconductor memory, is being released in order to be used together with or substituted for a Hard Disc Drive (HDD) in a personal computer (PC) or the like by being connected to a host according to an AT attachment (ATA) interface scheme.

As shown in FIG. 2, the SSD is configured to include a flash memory array 20, a memory interface 21, a controller 22, an interface 23 and the like.

The SSD, unlike an ODD, does not have a mechanically driven part. For this reason, the SSD is much more advantageous over the ODD in terms of slimness, data access rates, noise generation and power consumption.

SUMMARY

It is, therefore, an object of the present invention to provide a method for efficiently managing a defect of an optical disc by utilizing advantages of a Solid State Drive (SDD) in a device in which an optical disc drive (ODD) and the SSD are integrated together.

According to an aspect of the present invention, there is provided a method for managing a defect of an optical disc, the method including: when receiving from a host a request for data of an optical disc inserted into an optical disc drive (ODD) included in a device to be integrated with a solid state drive (SSD), comparing an address of the requested data with contents contained in defect management information managed within the SSD; and reading the requested data from the optical disc or from the defect management information according to a result of the comparing.

According to another aspect of the present invention, an optical disc drive (ODD)-solid state drive (SSD) integrated disc drive including: an ODD for recording or reading data on or from an optical disc; an SSD for recording or reading data on or from a semiconductor memory; and a controller, when receiving from a host a request for data of the optical disc inserted in the ODD, configured to compare an address of the requested data with contents contained in defect management information managed within the SSD, and control the ODD or the SSD according to a result of the comparing so as to read the requested data from the optical disc or from the defect management information.

The defect management information may include optical disc identification information, address information, defect type information and data of a corresponding address.

The defect type information may include data read delay or data read failure at a corresponding defect address. When the defect type information indicates the data read delay, the data of a corresponding address may include recovered data. When the defect type information indicates the data read failure, the data of a corresponding address may include null data or data normally read before the corresponding address.

When the optical disc is inserted into the ODD or in a case in which the device is supplied with power or is reset in a state in which the optical disc is in the ODD, defect management information regarding the optical disc may be generated and stored in the SSD.

The defect management information regarding the optical disc may be generated only when identification information of the optical disc inserted in the ODD is absent from the defect management information stored in the SSD.

The defect management information may be generated according to one of a method of preferentially detecting all of defect data of the optical disc inserted in the ODD, a method of detecting the defect data while performing a playback operation upon the optical disc, and a method of detecting the defect data only while the ODD is in an idle state.

According to the exemplary embodiments of the present invention, errors such as Read Delay or Read Fail, caused by a defect of an optical disc, can be efficiently prevented.

BRIEF DESCRIPTION OF THE DRAWINGS

The above and other objects and features of the present invention will become apparent from the following description of preferred embodiments given in conjunction with the accompanying drawings, in which:

FIG. 6 is a defect management table (DMT) managed according to an exemplary embodiment of the present invention.

DETAILED DESCRIPTION OF THE EMBODIMENTS

Hereinafter, a method for managing a defect of an optical disc according to preferred exemplary embodiments of the present invention will be described with reference to accompanying drawings.

A method for managing a defect of an optical disc, according to an exemplary embodiment of the present invention, is applicable to a device in which an optical disc drive (ODD) and a solid state drive (SSD) are integrated (i.e., an ODD-SSD integrated device).

According to an exemplary embodiment of the present invention, in order to prevent data read delay (hereinafter, Read Delay) or data read failure (hereinafter, Read Fail) from being caused by a defect of an optical disc inserted into an ODD in an ODD-SSD integrated device, information regarding a defect present in the inserted optical disc, namely, data regarding an address of the location of a defect (i.e., defect address) and data in a defect area is stored in the SSD in the form of a table, and data stored in the SSD rather than the ODD can be transmitted in response to access to the defective region.

Figure 1:
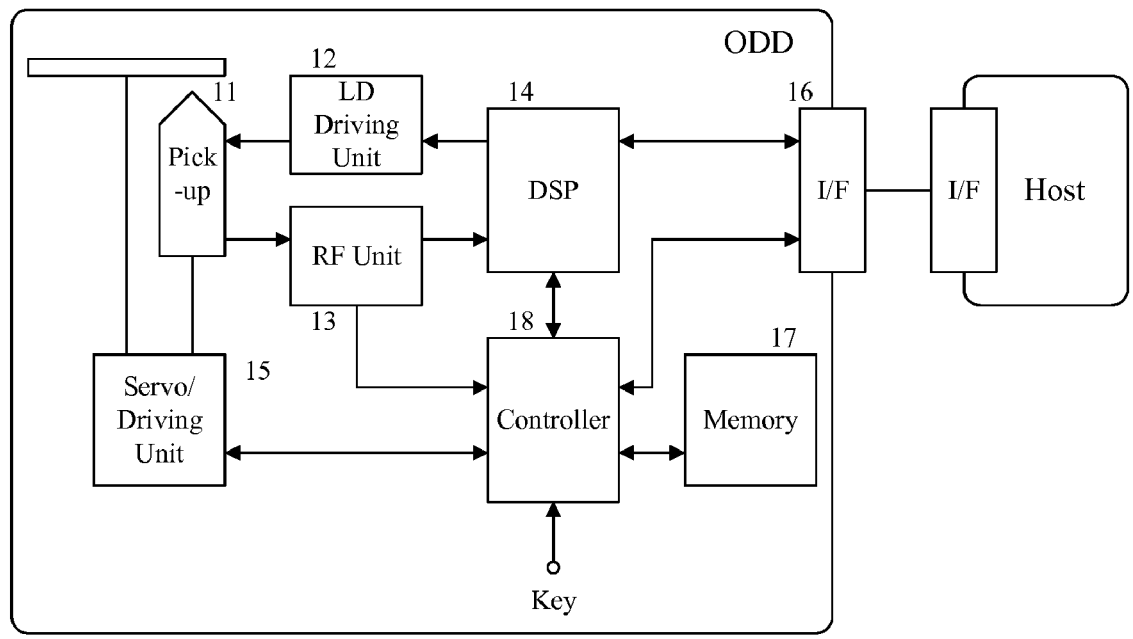
FIG. 1 is a diagram showing the configuration of a general optical disc drive.
Figure 2:
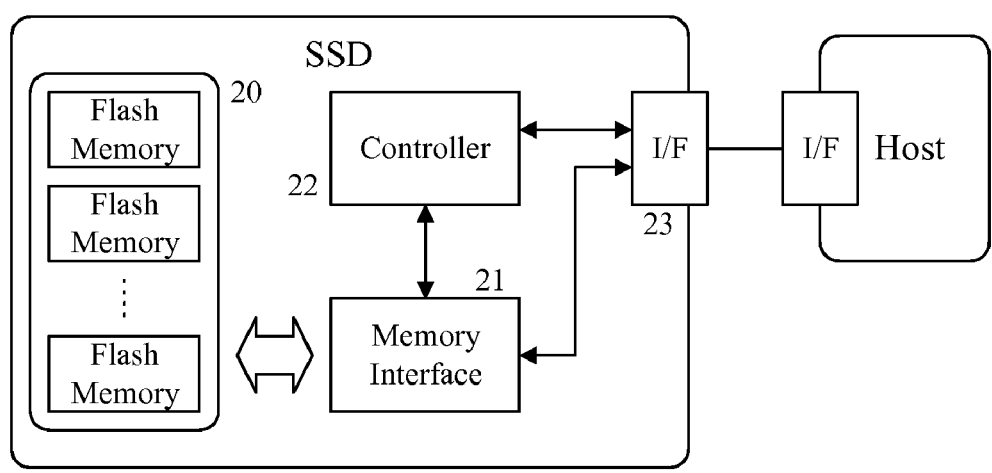
FIG. 2 is a diagram showing the configuration of a general solid state drive (SSD)
Figure 3:
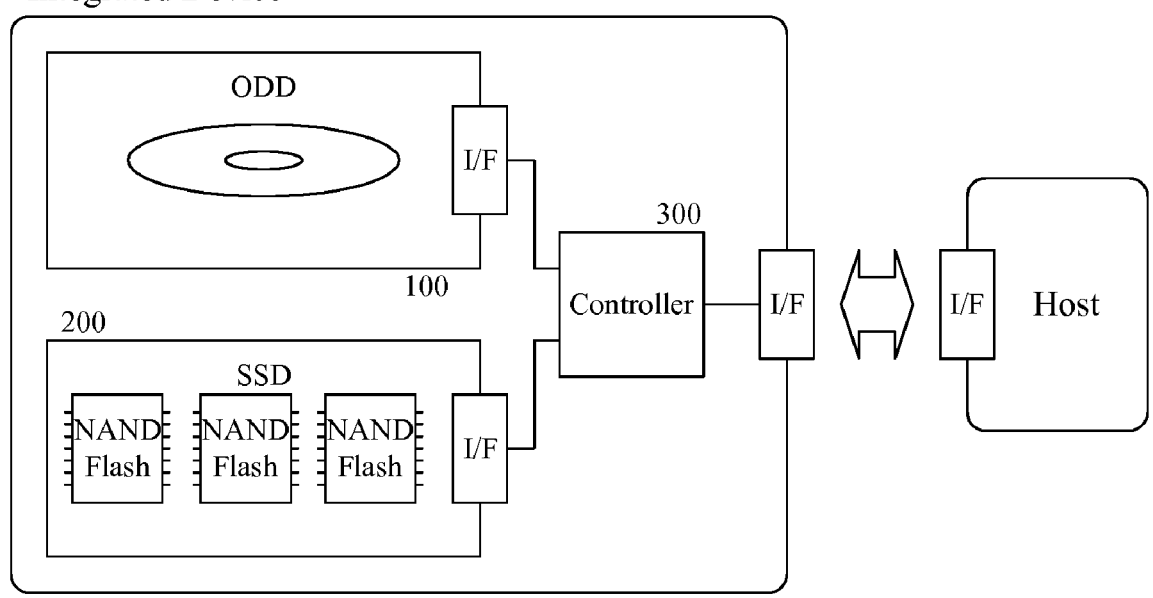
FIG. 3 is a diagram illustrating a configuration in which an ODD-SSD integrated device is connected to a host, according to an exemplary embodiment of the present invention.

As shown in FIG. 3, the device may be configured to include an ODD 100, an SSD 200, a controller 300, and the like. The controller 300 may be connected to a host Host via various types of interface schemes (e.g., SATA, SCSI or the like).

In the case in which the optical disc is inserted into the ODD 100 or the device is supplied with power or is reset in a state where the optical disc is in the ODD 100 or according to a user's request, the controller 300 detects defect data present in the optical disc. For example, if the optical disc is a new optical disc that is inserted for the first time, the controller 300 performs an interface operation with the host to thereby display a user selection menu screen for setting a defect check mode on a monitor of the host.

Figure 4:
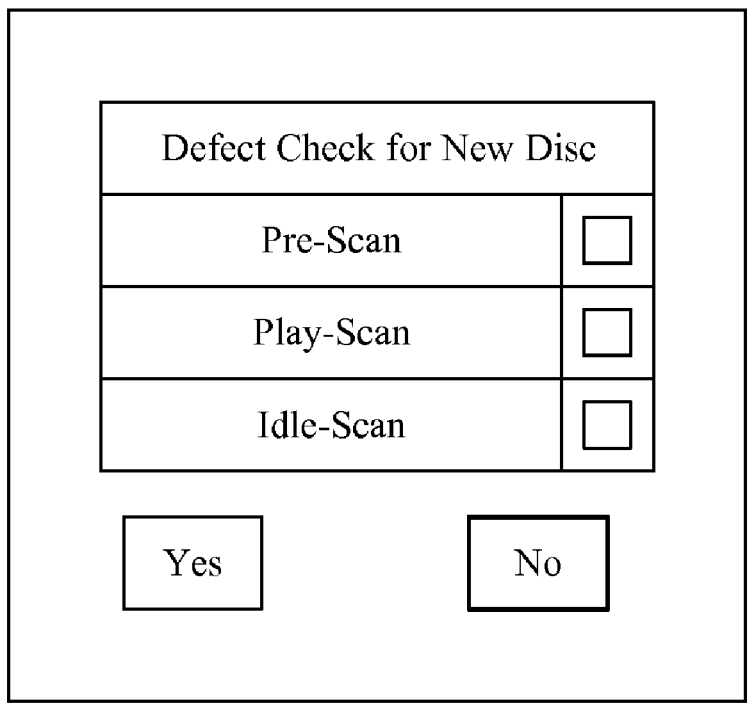
FIG. 4 is a diagram illustrating a user selection menu screen being displayed according to an exemplary embodiment of the present invention.
Figure 4:
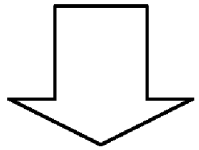
Figure 4:
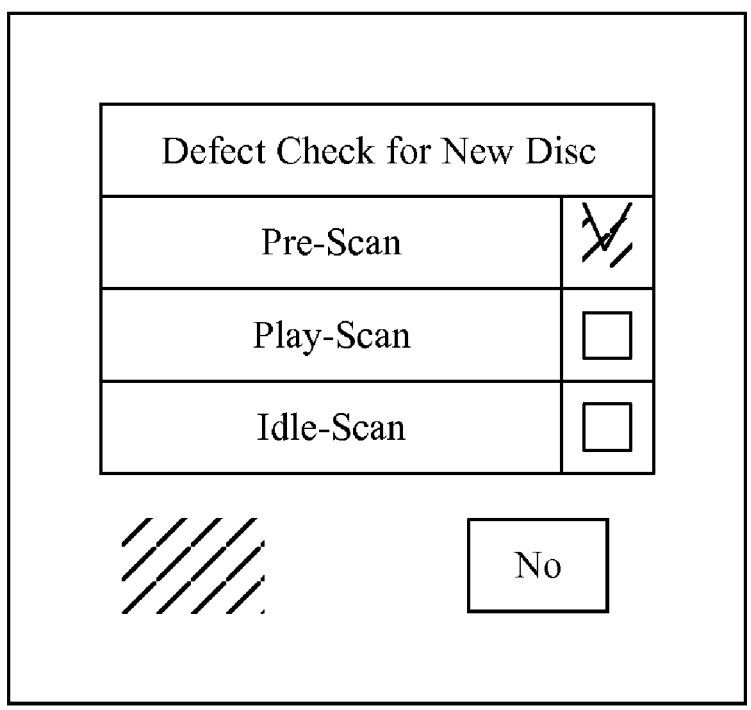

The user selection menu screen, as shown in FIG. 4, displays menu items for setting the defect check mode for the new disc as any one of a pre-scan method, a play-scan method, and an idle-scan method.

For example, the pre-scan method may be defined as a method in which a defect check operation is preferentially performed upon an optical disc prior to performing a playback operation of the optical disc. The play-scan method may be defined as a method in which the defect check operation is performed while the optical disc is being reproduced. The idle-scan method may be defined as a method in which the defect check operation is performed only during an idle state of the ODD caused when any command is not received from the host.

When the user sets the defect check mode, the controller 300 performs a corresponding operation. Hereinafter, a case in which the pre-scan method is selected will be described in detail by way of example.

Figure 5:
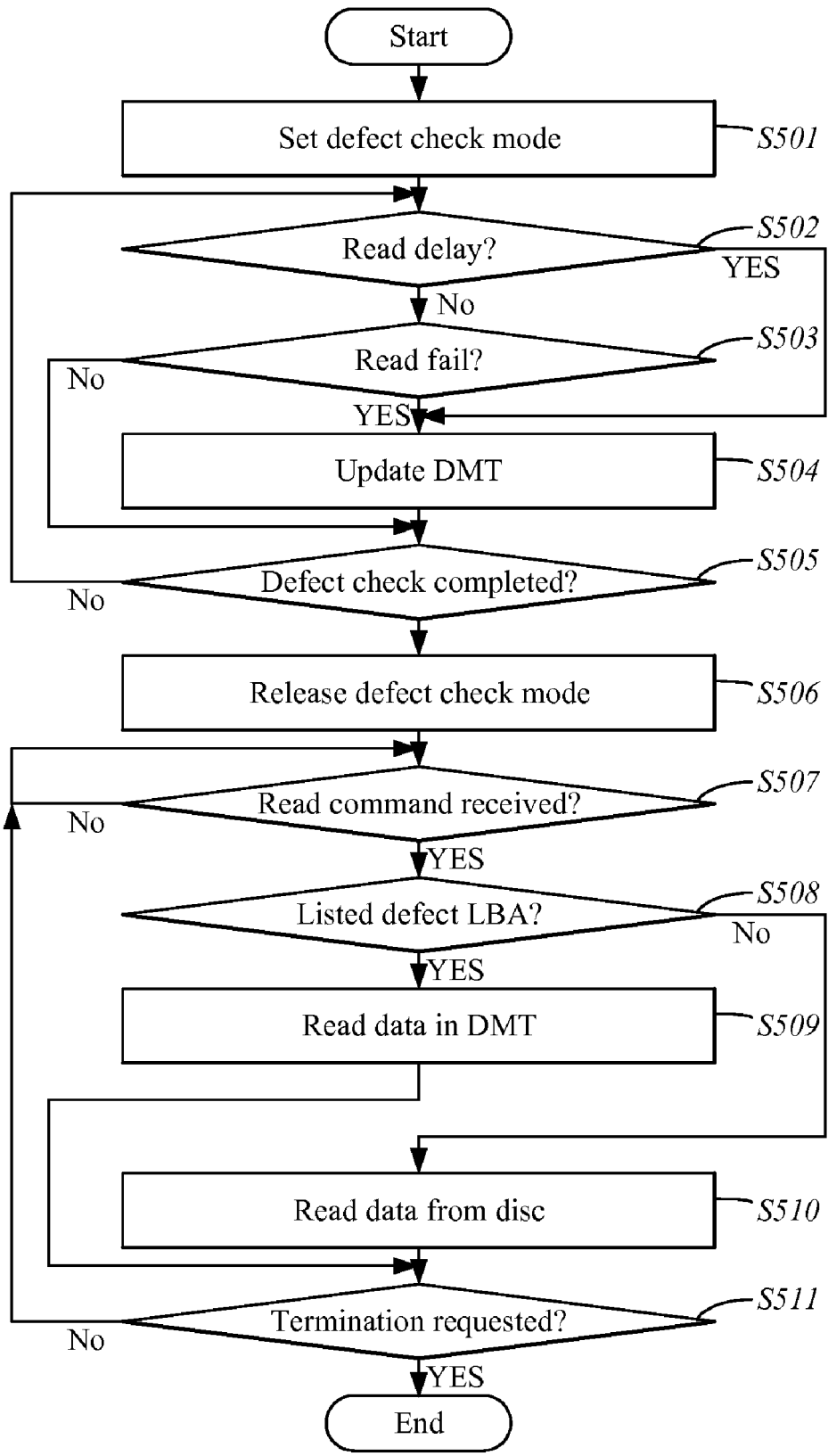
FIG. 5 is a flowchart illustrating a method for managing a defect of an optical disc, according to an exemplary embodiment of the present invention.

As shown in FIG. 5, when the pre-scan method is set as the defect check mode based on the user's section (S501), the controller 300 searches for a specific area of the optical disc inserted into the optical disc drive 100, for example, a Lead-In area, thereby reading disc information Disc_Info., such as an ID, type, recording capacity, Table of Contents (TOC) information of the optical disc.

Thereafter, the disc information Disc_info. is compared with defect management information, for example, a defect management table (DMT) managed in a flash memory in the SSD 200. For example, as shown in FIG. 6, the DMT may be configured to store, in the form of a Look-Up Table, disc identification information (e.g., Disc Info.#) for identifying an optical disc, address information (e.g., Logical Block Area: LBA) indicating a record section of defect data in the optical disc, defect type information indicating whether a cause of a defect is Read Delay or Read Fail, and data recovered by correcting an error of the defect data (hereinafter, also referred to as recovered data).

When the disc information read from the Lead-In area is already present in the DMT, namely, when the disc identification information regarding the optical disc exists in the DMT, the controller 300 determines that the defect check operation was performed previously, and thus may skip the defect check operation.

In contrast, when the disc identification disc information read from the Lead-In area of the optical disc is not present in the DMT, the controller 300 performs the defect check operation with respect to data recorded on the optical disc.

While the defect check operation is being carried out, if Read Delay, indicating that data reading is delayed for longer than a preset reference period, occurs (S502) or if Read Fail, indicating that data reading fails, occurs (S503), the DMT is updated (S504) by additionally recording corresponding disc information (e.g., Disc_Info.) regarding the optical disc, information regarding a record section (e.g., LSA) where a defect occurs, defect type information (e.g., Read Delay or Read Fail), and data (e.g., Data) recovered through error correction into the DMT.

For example, in the case in which a cause of the defect is Read Delay, data recovered through error correction (i.e., recovered data) is recorded. In the case in which a cause of the defect is a Read Fail, Null data may be recorded. However, in this case, if the optical disc is an audio CD, a video CD or a video DVD, namely, a disc storing A/V data, audio or video data read from a record section right before Read Fail may be recorded instead of the Null data.

When the above series of defect check operations are completed (S505), the controller 300 releases the defect check mode (S506).

Thereafter, an operation corresponding to a command received from a host is performed. When a read command to read a random specific record section is received from the host (S507), the controller 300 checks whether the specific record section is already present in the DMT.

When the checking result reveals that the specific record section is present in the DMT (S508), the controller 300 reads recovered data recorded in the DMT instead of the specific record section (S509). In contrast, when the specific record section is not recorded in the DMT, data recorded in the specific record section of the optical disc is normally read (S510).

The above series of operations are repetitively performed (S511) until a request for termination is made. Since the recovered data previously recorded after an error correction operation is read from the DMT without reading defect data of the optical disc, Read Delay or Read Fail is prevented from occurring.

As described above, the DMT is updated by the pre-scan method, the play-scan method, the idle-scan method or the like, but may be updated by other methods other than the pre-scan method, the play-scan method and the idle-scan method.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for managing a defect of an optical disc, the method comprising:

when receiving from a host a request for data of an optical disc inserted into an optical disc drive (ODD) included in a device to be integrated with a solid state drive (SSD), comparing an address of the requested data with contents contained in defect management information managed within the SSD; and reading the requested data from the optical disc or from the defect management information according to a result of the comparing.

2. The method of claim 1, wherein the defect management information includes optical disc identification information, address information, defect type information, and data of a corresponding address.

3. The method of claim 2, wherein the defect type information indicates data read delay or data read failure at a corresponding defect address.

4. The method of claim 3, wherein when the defect type information indicates the data read delay, the data of a corresponding address includes recovered data.

5. The method of claim 3, wherein when the defect type information indicates the data read failure, the data of a corresponding address includes null data or data normally read before the corresponding address.

6. The method of claim 2, further comprising generating defect management information regarding the optical disc and storing the defect management information in the SSD, when the optical disc is inserted into the ODD or in a case in which the device is supplied with power or is reset in a state in which the optical disc is in the ODD.

7. The method of claim 6, wherein the defect management information regarding the optical disc is generated only when identification information of the optical disc inserted in the ODD is absent from the defect management information stored in the SSD.

8. The method of claim 6, wherein the defect management information is generated according to one of a method of preferentially detecting all of defect data of the optical disc inserted in the ODD, a method of detecting the defect data while performing a playback operation upon the optical disc, and a method of detecting the defect data only while the ODD is in an idle state.

9. An optical disc drive (ODD)-solid state drive (SSD) integrated disc drive comprising:

an ODD for recording or reading data on or from an optical disc;

an SSD for recording or reading data on or from a semiconductor memory; and a controller, when receiving from a host a request for data of the optical disc inserted in the ODD, configured to compare an address of the requested data with contents contained in defect management information managed within the SSD, and control the ODD or the SSD according to a result of the comparing so as to read the requested data from the optical disc or from the defect management information.

10. The ODD-SSD integrated device of claim 9, wherein the defect management information includes optical disc identification information, address information, defect type information and data of a corresponding address.

11. The ODD-SSD integrated device of claim 10, wherein the defect type information indicates data read delay or data read failure at a corresponding defect address, wherein the data of a corresponding address includes recovered data when the defect type information indicates the data read delay, and the data of a corresponding address includes null data or data normally read before the corresponding address, when the defect type information indicates the data read failure.

12. The ODD-SSD integrated device of claim 10, wherein the controller generates defect management information regarding the optical disc and stores the defect management information in the SSD, when the optical disc is inserted into the ODD or in a case in which the ODD-SSD integrated device is supplied with power or is reset in a state in which the optical disc is in the ODD.

13. The ODD-SSD integrated device of claim 12, wherein the controller generates the defect management information regarding the optical disc only when identification information of the optical disc inserted in the ODD is absent from the defect management information stored in the SSD.

14. The ODD-SSD integrated disc drive of claim 12, wherein the controller generates the defect management information according to one of a method of preferentially detecting all of defect data of the optical disc inserted in the ODD, a method of detecting the defect data while performing a playback operation upon the optical disc, and a method of detecting the defect data only while the ODD is in an idle state.

* * * * *